United States Patent Office.

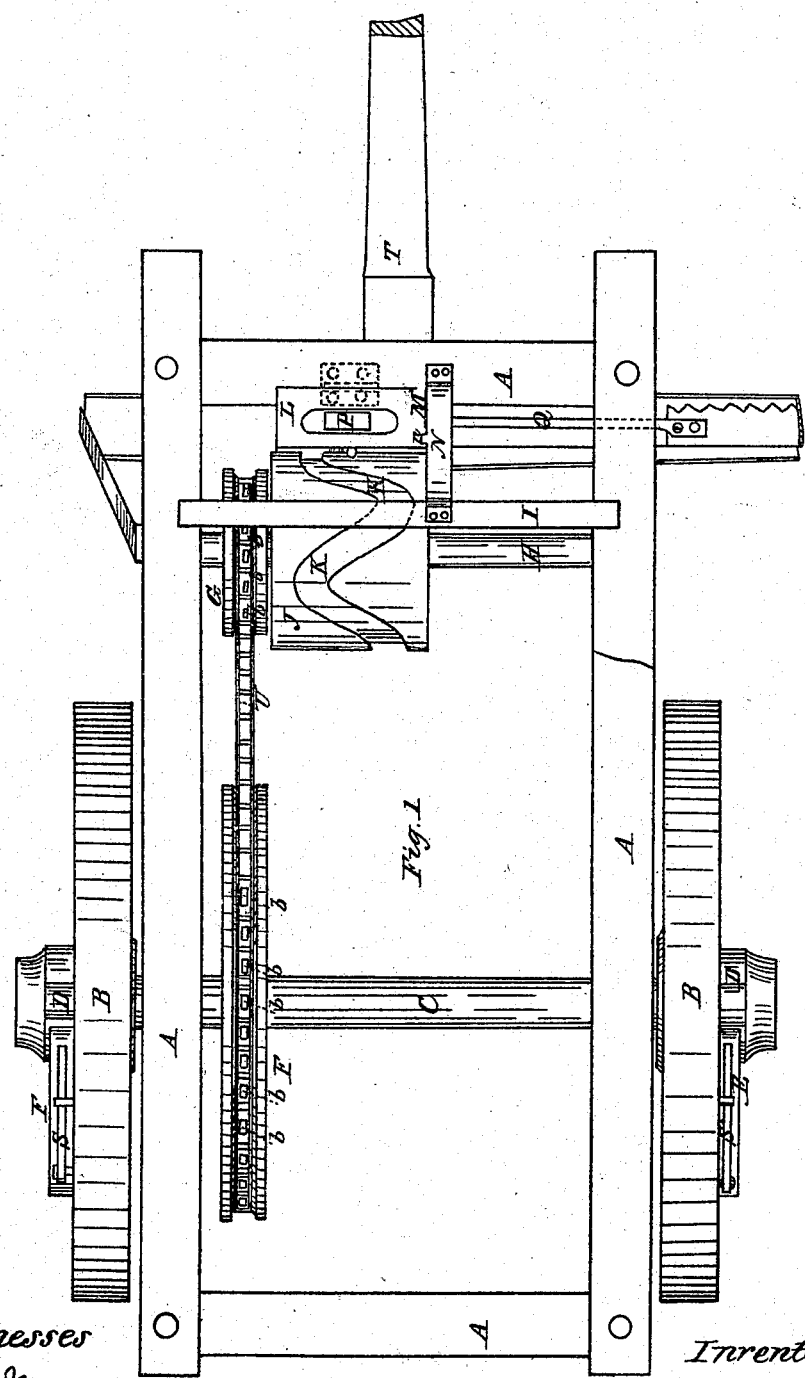

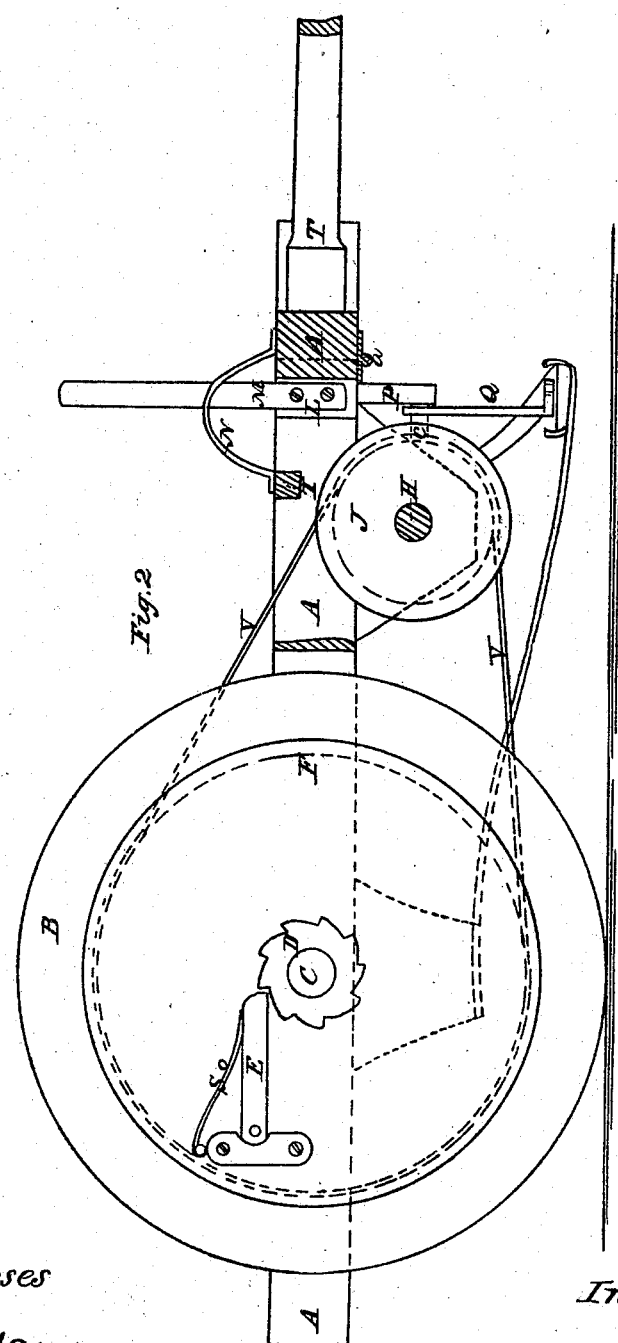

WILLIAM ROSE, OF LAKE, ILLINOIS.

Letters Patent No. 74,600, dated February 18, 1868.

IMPROVEMENT IN HARVESTERS.

The Schedule referred to in these Letters Patent and making part of the same.

TO ALL WHOM IT MAY CONCERN:

Be it known that I, WILLIAM ROSE, of Lake, in the county of Cook, and State of Illinois, have invented a new and useful Improvement in Harvesters; and I do hereby declare and make known that the following is a full, clear, and exact description of the same, reference being had to the accompanying drawings, and the figures and letters of reference thereon, which form part of this specification.

My said invention consists in a novel arrangement of mechanism for imparting the requisite reciprocating movements to the sickle of a harvesting or mowing-machine, and also for throwing said mechanism into or out of gear, as desired; and to enable those skilled in the art to make and use my invention, I will proceed to describe the same with particularity, making reference in so doing to the aforesaid drawings, in which—

Figure 1 represents a plan or top view of my invention, and

Figure 2 a side view thereof, partly in section.

Similar letters of reference in the different figures denote the same parts of my invention.

A represents a suitable rectangular frame, which may be constructed in any desirable manner, having bearings upon each side for the axle C, upon which are arranged the wheels B B, which may revolve upon the axle, which, in turn, may also turn within its bearings, as hereinafter described. Upon said axle, close to each wheel, is fixed a ratchet-wheel, D, while there is pivoted upon each wheel a pawl, E, held upon said ratchet by springs S, so that, when the machine is moved forward, the axle turns with the wheels, but when the machine is backing or turning around, the wheels may revolve without turning said axle. Upon the axle C is fixed a large drive-wheel, F, whose periphery is provided with a series of teeth or projections marked $b\ b$, as is also the periphery of the wheel G, upon the shaft H, as shown. Around said wheels F G passes a chain, U, whose links engage with the projections $b$ aforesaid, so that the revolution of the wheel F revolves the wheel G, and its shaft H, and consequently the cam-wheel J upon said shaft H, as shown. The circumference of the said wheel or drum J is provided with a sinuous groove or chamber, K, passing entirely around the same, in which a pin, $c$, upon a vertical arm, P, enters or is thrown out from, as hereinafter described. The said arm P is pivoted to the frame of the machine in such a manner as to allow the lower end thereof, to which the pin $c$ is attached, to have a lateral movement from side to side when the said pin $c$ lies in the channel K and the machine is in operation.

To the said lower end of the arm P is attached the rod Q, connected with the sickle, so that the revolution of the wheel J, as aforesaid, by its action upon the pin $c$, by means of the sinuous or cam-groove K, gives the desired reciprocating motion to the sickle. The said arm P passes through a slot in a block, L, to which it is pivoted as aforesaid, said block being secured to the frame A by a hinge, $a$, or its equivalent, as seen in fig. 2. Upon one end of said block L is fixed a vertical arm, M, which bears against an arc, N, provided with a lip, $n$, so that, when the arm M is arranged before the projection $n$, the block L is locked firmly and rigidly to the frame A, and the pin $c$ enters into the groove K on the wheel J; but when the arm is drawn back of said projection, the block L yields upon its hinge and moves away from the wheel J, throwing the pin $c$ out of the groove K, and throwing the machine out of gear, as desired. Instead of the wheels F and G, and the chain U for imparting a rotary motion to the cam-wheel J, cog-gearing may be employed for that purpose, although I prefer the devices herein shown and described.

It is obvious that the herein-described means of operating the sickle and throwing the driving-apparatus out of gear may be used with equal advantage whether the sickle be arranged at the front of the machine, as shown, or at the rear thereof behind the wheels.

Having described the construction and operation of my invention, I will specify what I claim, and desire to secure by Letters Patent.

I claim the combination of the cam-wheel J K, arm P, rod Q, block L, arm M, and arc N, all constructed, arranged, and operating in the manner set forth, and for the purposes specified.

WILLIAM ROSE.

Witnesses:
W. E. MARRS,
L. L. COBURN.